April 17, 1962 K. H. SWART 3,029,881
BIT LUBRICATOR
Filed June 9, 1959 2 Sheets-Sheet 2
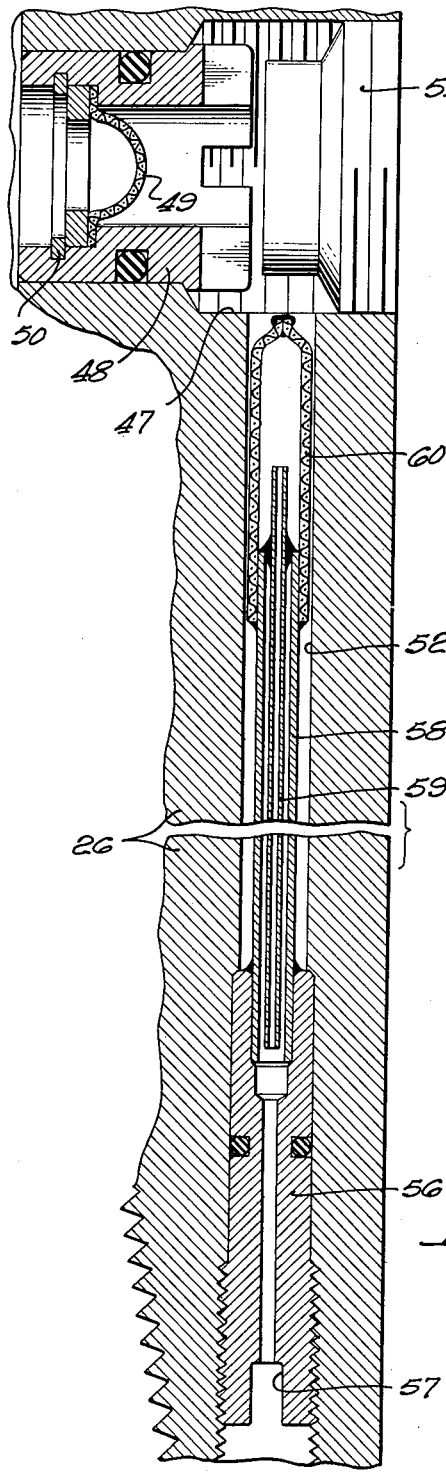
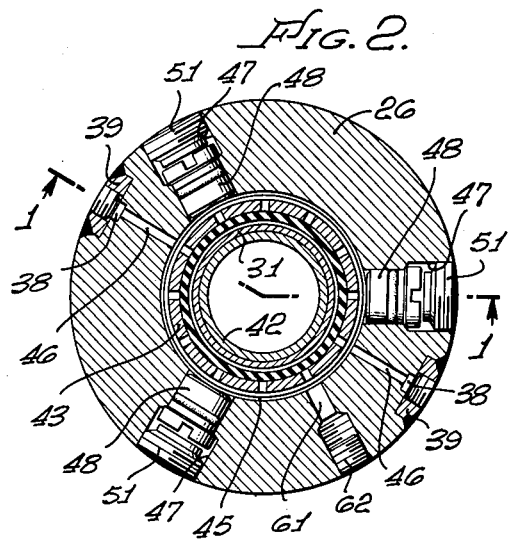
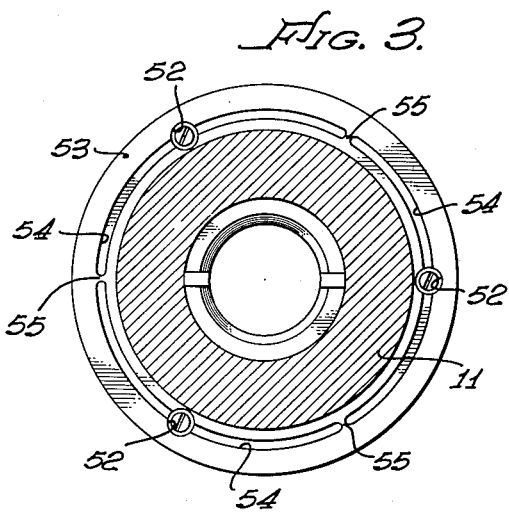
INVENTOR.
KENNETH H. SWART
BY
Hazard & Miller
ATTORNEYS.

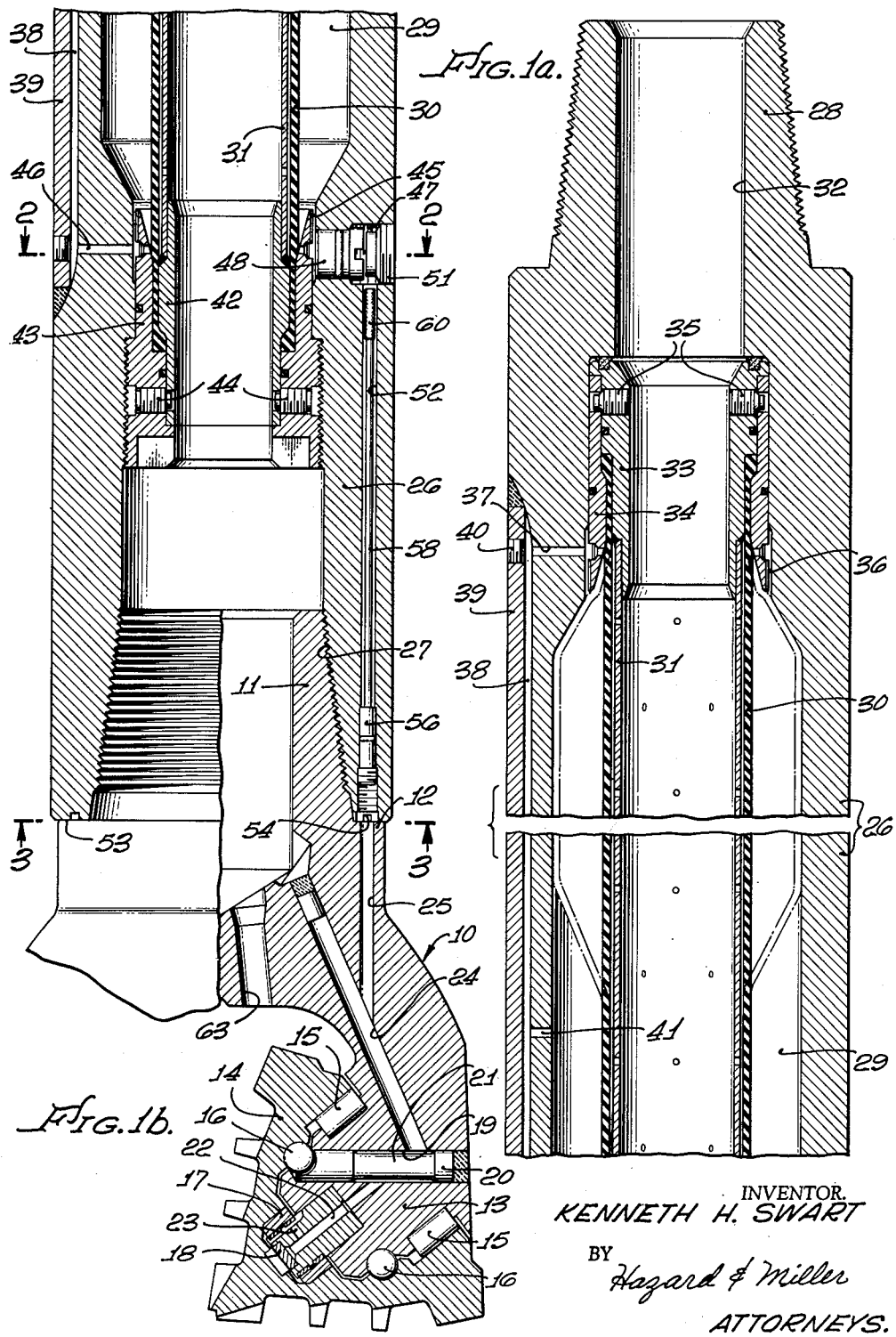

United States Patent Office 3,029,881
Patented Apr. 17, 1962

3,029,881
BIT LUBRICATOR
Kenneth H. Swart, Compton, Calif., assignor to H. C. Smith Oil Tool Co., Compton, Calif., a corporation of California
Filed June 9, 1959, Ser. No. 819,169
1 Claim. (Cl. 175—228)

The invention relates to a lubricated well drilling bit.

For various reasons it is desirable to feed to the bearings of a roller type well drilling bit a lubricant which will be supplied to the bearings in a continuous metered quantity. Roller type bits, commonly referred to as rock bits, are being rotated at relatively high speeds in present-day drilling operations and are being subjected to constantly increasing loads. The sizes of the bits are such that the available space for bearings for the rollers is limited. Consequently it is important to keep these bearings well lubricated at all times.

Heretofore attempts have been made to lubricate the bearings of roller type bits. However, the designs heretofore developed have been subject to a number of objections. Most of the designs locate the lubricant reservoir in the path of the circulation fluid that is descending through the drill stem and are objectionable for that reason. Other designs employ a piston in the lubricant reservoir that is intended to be actuated by the pressure of the circulation fluid to expel lubricant from the lubricant reservoir into the bearings. These have the objection that grit in the circulation fluid frequently causes the piston to bind in its cylinder so that the piston malfunctions and fails to expel the lubricant. Some designs also fail to adequately meter the rate of feed of the lubricant from the lubricant reservoir to the bearings with the result that either the entire supply of lubricant is rapidly fed to the bearings and is exhausted before the bit has completed its run, or the lubricant is supplied to the bearings at an inadequate rate.

A primary object of the present invention is to provide a lubricated bit which will overcome all of the above-mentioned objections in that the lubricant reservoir and the means for expelling the lubricant therefrom are so arranged and located as not to interfere with the descent of circulation fluid to the bit. No pistons are employed which may bind in their cylinders and malfunction. Furthermore, an adjustable or variable metering device is provided which will regulate the rate of flow from the lubricant reservoir to the bearings. This metering device is important to assure that lubricant will be supplied to the bearings at the proper rate under varying bottom-hole conditions. Temperature conditions existing at the bottom of the well hole are apt to affect the viscosity of the lubricant. Also, the differentiation in pressure existing between the interior and exterior of the bit affects the pressure exerted on the lubricant urging it to be expelled from the lubricant reservoir and into the bearings. The metering device can be adjusted prior to each bit run in order to meet these varying conditions.

With the foregoing and other objects in view which will be made manifest in the following detailed description and specifically pointed out in the appended claims, reference is had to the accompanying drawings for an illustrative embodiment of the invention, wherein:

FIGURES 1a and 1b, collectively, are vertical sections through a typical well drilling bit lubricated by means of the lubricator embodying the present invention. These figures may be regarded as having been taken on the sectional line 1—1 on FIG. 2;

FIG. 2 is a horizontal section taken substantially upon the line 2—2 upon FIG. 1b in the direction indicated;

FIG. 3 is a horizontal section taken substantially upon the line 3—3 upon FIG. 1b in the direction indicated; and FIG. 4 is an enlarged partial view in vertical section illustrating details of construction of the metering device.

Referring to the accompanying drawings wherein similar reference characters designate similar parts throughout, the bit 10 may be of any conventional or preferred roller bit type having the usual threaded pin 11 surrounded by an upwardly-facing shoulder 12. As illustrated, the bit has journals 13 on which rollers or cones 14 are rotatably mounted. The bearings employed between the rollers or cones and their journals 13 vary considerably and, in some instances, they are merely friction bearings. However, better practice is to employ anti-friction bearings which, as illustrated, are shown as consisting of rollers 15 and balls 16. Near the outer ends of the journals there may be friction radial bearings 17 and friction thrust bearings 18. The balls 16 are fed into the races therefor through an aperture 19 which is subsequently plugged as by the plug 20, the exterior of which is reduced as at 21 to provide a passage for feeding lubricant to passages 22 and 23 leading to the thrust bearing 18 and radial friction bearing 17, respectively. The lubricant, after being fed to these bearings, is allowed to pass outwardly between the roller or cone 14 and the journal 13 and lubricate the ball bearing 16 and the roller bearing 15 before escaping. The lubricant is supplied to the passage 21 surrounding plug 20 through passages 24 and 25, the latter of which terminates on the shoulder 12.

The above described construction with the exception of passage 25 may be regarded as more or less conventional or typical of the usual rock bit, particularly bits designed for air or water lubrication. Sometimes the bit has only three legs and consequently only three journals 13. In other instances the rock bit has four legs, each of which is equipped with a journal and its respective roller cutter. The present invention is applicable to either type of bit, it being merely desirable to have the passages for feeding lubricant to the bearings on the legs terminate on the shoulder 12 for the reason hereinafter described.

The lubricator embodying the present invention comprises a sub or adapter 26 internally threaded at its lower end as at 27 for connection with the pin 11 and equipped with a threaded pin 28 at its upper end for connection with the drill collars that are normally located immediately above the bit. Within this sub or adaptor there is a lubricant reservoir 29 the inner wall of which is formed by an expansible rubber or elastic sleeve 30. Within the sleeve 30 there is a perforated tube 31 the internal diameter of which is preferably approximately the same as that of the bore 32 through the sub so as to avoid restricting the downward flow of circulation fluid through the drill string to the bit. On the upper end of the perforated tube 31 there is an inner bushing 33 surrounded by an outer bushing 34. These bushings are locked in assembled relationship by means of half-dog points 35 to clamp the top of the flexible sleeve 30 therebetween. They are sealed against leakage between each other and between the outer bushing 34 and the interior of the sub as illustrated.

A small clearance exists between the bottom of the outer busing 34 and the interior of the sub 26 as illustrated at 36. This provides an upper outlet from the lubricant reservoir 29 communicating with apertures 37 which lead to grooves 38 milled externally of the sub and which are closely by plates 39 that are welded in place and which are equipped with plugs 40 opposite the apertures 37. Additional apertures 41 may provide communication between the reservoir 29 and the grooves 38 intermediate the top and bottom thereof.

The lower end of the flexible sleeve 30 is similarly anchored between inner and outer bushings 42 and 43 held in assembled relationship by having half-dog points 44, the outer bushing 43 being threaded into the sub 26. The perforated tube 31 is preferably welded at its top and bottom to the inner bushings 33 and 42 respectively. A clearance 45 exists between the top of the lower outer bushing 43 and the interior of the sub providing a lower outlet from the lubricant reservoir 29 to apertures 46 which lead to the grooves 38.

For each leg of the bit there is an outlet passage 47 in which there is disposed a removable strainer holder 48 on which is removably mounted a strainer 49 held in place such as by a snap ring 50. The outer end of each passage 47 is closed by a threaded plug 51. The passage 47 communicates with a vertical bore 52 in the sub that leads downwardly so as to terminate on the bottom 53 of the sub which abuts the shoulder 12 on the bit. As illustrated in FIG. 3, each vertical passage 52 communicates with an arcuate groove 54 on the bottom face of the sub, and each groove 54 is separated from its adjoining groove by a narrow partition 55. In this manner, regardless of the exact position that the sub makes up with relation to the bit, a groove 54 will always be in communication with the top end of passage 25. The partitions 55 are employed so as to isolate the lubricant feed to each leg of the bit from the lubricant feed of the other leg. In the vertical passage 52 there is a metering device consisting of a holder 56 threaded into the passage and equipped with a screwdriver kerf or the equivalent indicated at 57. This holder has rigidly mounted thereon an outer tube 58 within which there is rigidly positioned a metering tube 59. The internal diameter of the metering tube 59 governs the rate of flow of lubricant therethrough and is normally quite small as it is usually desirable to feed lubricant to each journal at the rate of from one to five cc. per minute. On the top of the tube 58 there is preferably a fine mesh screen 60 covering the entrance to the tube and cooperating with the screen 49 to assure that no foreign matter in the lubricant can pass to the entrance of the metering tube 59 and plug it against the flow of lubricant therethrough.

In the wall of the sub there is a filling aperture 61 normally closed by a plug 62 through which the lubricant reservoir can be refilled.

The operation of the above described construction is substantially as follows:

A pressure drop exists across the discharge nozzle or outlet 63. That is, the pressure within the bit and within the sub above the outlet 63 is greater than the pressure existing externally of the bit. This differential in pressure is effective through the perforations in the perforated tube 31 to expand the expansible sleeve 30. Lubricant in the lubricant reservoir 29 is consequently urged to be expelled therefrom, and it may find egress therefrom either through the clearance 45 or through passages 41, 37, 46, and groove 38. The expelled lubricant passes through screen 49 and screen 60 and through the metering tube 59 which regulates the rate at which the lubricant can be expelled and fed to the journal against the pressure that exists externally of the bit.

As it is unknown whether in a given situation the top, bottom, or center of the expansible sleeve 30 will expand into engagement with the interior of the sub first, the multiplicity of outlets from the reservoir 29 is provided. In other words, if the bottom of the expansible sleeve 30 should expand first into engagement with the outer walls of the reservoir 29, thus sealing off or isolating the upper portion of the reservoir from the outlet passages 47, egress from the lubricant reservoir under these circumstances may take place through apertures 41, grooves 38, and apertures 46 to the outlet passage 47.

If apertures 41 become closed by the expanding sleeve then egress from the lubricant reservoir may occur through apertures 37, grooves 38 and passages 46. In this manner, egress of lubricant from the lubricant reservoir is assured at all times regardless of what portion of the expansible sleeve 30 may expand first into engagement with the outer walls of the lubricant reservoir 29.

As drilling proceeds in a given well, bottom hole conditions of pressures and/or temperatures may change requiring a greater or less discharge of lubricant to the journals. When this occurs the mere detachment of the bit from the sub exposes the lower end of the meter tube holder 46 which can be unscrewed and bodily removed. It may be replaced with another meter tube holder having a metering tube 59 of greater or less internal diameter to meet the requirements of the changed conditions. In this manner adjustment of the rate of flow of lubricant from the lubricant reservoir 29 to the journal can be easily and quickly accomplished.

Whenever it is desired to refill the lubricant reservoir 29 with lubricant, this can be accomplished by removing the plug 62 in the filler opening 61, and pumping lubricant into the reservoir. This is normally done while one or more plugs 40 are removed to permit the escape of air from the lubricant reservoir during refilling. Inward collapse of the flexible sleeve 30 during refilling is prevented by the perforated tube 31.

From the above described construction it will be appreciated that an improved lubricated bit has been provided possessing a number of advantages in that the downward flow of circulation fluid through the drill stem to the bit is not impeded or retarded. Furthermore, the expelling of the lubricant from the lubricant reservoir is not accomplished by means of pressure-actuated pistons which are apt to bind or sieze in the cylinders in which they are reciprocable. The presence of grit in the circulation fluid does not in any way interfere with the expansion of the expandible sleeve 30. Furthermore, as the flow of lubricant from the lubricant reservoir to the journal can be variably metered, a proper and continuous flow of lubricant to the bearings of the roller cutter at all times is assured.

Various changes may be made in the details of construction without departing from the spirit and scope of the invention as defined by the appended claim.

I claim:

A well drilling bit comprising a bit body having roller cutters rotatably mounted thereon and having lubricant passages therein leading to bearings for the cutters and a circulation fluid passage providing for the discharge of circulation fluid, a sub threadedly connected to the body having a circulation fluid passage in communication with the circulation fluid passage in the bit, a flexible sleeve in the sub surrounding the circulation fluid passage therein, said sub providing a lubricant reservoir around the sleeve, said bit body and sub having opposed abutting shoulders at the threaded connection therebetween, the lubricant passages in the bit body terminating on the shoulder on the bit body, said sub having lubricant passages therein leading from the reservoir to the shoulder on the sub, there being one lubricant passage in the sub for each lubricant passage in the bit body, and a metering tube in each lubricant passage in the sub insertable and removable through the shoulder on the sub when the sub is detached from the bit body, each metering tube serving to regulate the rate of flow of lubricant from the lubricant reservoir to its respective lubricant passage in the bit body.

References Cited in the file of this patent

UNITED STATES PATENTS

| | | | |
|---|---|---|---|
| 1,136,134 | Hughes | Apr. 20, | 1915 |
| 1,334,632 | Pickin | Mar. 23, | 1920 |
| 1,482,787 | Fletcher | Feb. 5, | 1924 |
| 1,816,203 | Behnke | July 28, | 1931 |
| 1,875,023 | Krueger | Aug. 30, | 1932 |
| 1,921,702 | Reed | Aug. 8, | 1933 |
| 2,063,430 | Graser | Dec. 8, | 1936 |
| 2,814,464 | Pike et al. | Nov. 26, | 1957 |
| 2,831,660 | Smiecinski | Apr. 22, | 1958 |
| 2,880,970 | Swart | Apr. 7, | 1959 |
| 2,906,504 | Parks | Sept. 29, | 1959 |

FOREIGN PATENTS

| | | | |
|---|---|---|---|
| 1,041,890 | Germany | Oct. 30, | 1958 |